US008961682B2

(12) United States Patent
Carlson et al.

(10) Patent No.: US 8,961,682 B2
(45) Date of Patent: Feb. 24, 2015

(54) HYDROPHILIC PAINTS USING PIGMENTS COATED WITH ANTI-OXIDANTS

(75) Inventors: William Brenden Carlson, Seattle, WA (US); Angele Sjong, Louisville, CO (US); Feng Wan, Issaquah, WA (US); Timothy Londergan, Seattle, WA (US)

(73) Assignee: Empire Technology Development LLC, Wilmington, DE (US)

( * ) Notice: Subject to any disclaimer, the term of this patent is extended or adjusted under 35 U.S.C. 154(b) by 100 days.

(21) Appl. No.: 13/813,715

(22) PCT Filed: Jul. 26, 2012

(86) PCT No.: PCT/US2012/048275
§ 371 (c)(1),
(2), (4) Date: Feb. 1, 2013

(87) PCT Pub. No.: WO2014/018035
PCT Pub. Date: Jan. 30, 2014

(65) Prior Publication Data
US 2014/0196629 A1  Jul. 17, 2014

(51) Int. Cl.
C09D 7/00 (2006.01)
C09D 5/00 (2006.01)
C09C 1/00 (2006.01)
C09C 1/36 (2006.01)
C09C 3/08 (2006.01)
C09D 7/12 (2006.01)
C09D 5/16 (2006.01)
C08K 9/04 (2006.01)
C08K 3/00 (2006.01)
C08K 5/3435 (2006.01)

(52) U.S. Cl.
CPC ............ C09D 7/1233 (2013.01); C09D 7/1225 (2013.01); C09C 1/3669 (2013.01); C09D 5/1681 (2013.01); C09D 7/1241 (2013.01); C09D 7/1275 (2013.01); C09D 7/1283 (2013.01); C08K 9/04 (2013.01); C01P 2004/62 (2013.01); C09D 5/00 (2013.01); C08K 3/0033 (2013.01); C08K 5/3435 (2013.01)
USPC ........ 106/448; 106/18.32; 106/428; 106/429; 106/445; 106/447; 106/453; 106/459; 106/460; 106/463; 106/499; 252/397; 252/400.1; 252/400.3; 252/405; 252/588; 252/589; 427/215; 427/220; 427/419.2; 427/419.3; 427/421.1; 427/427.4; 427/428.01; 427/429; 427/430.1

(58) Field of Classification Search
CPC ........ C04B 14/00; C04B 14/26; C04B 14/36; C04B 14/363; C04B 14/30; C04B 14/305; C04B 14/307; C04B 14/308; C04B 14/309; C08K 3/0033; C08K 3/0041; C08K 3/20; C08K 5/005; C08K 2201/00
USPC ......... 106/428, 429, 447, 448, 459, 460, 453, 106/463, 18.32, 445, 446; 427/215, 220, 427/419.2, 419.3, 421.1, 427.4, 758.01, 427/429, 430.1; 252/397, 400.1
See application file for complete search history.

(56) References Cited

U.S. PATENT DOCUMENTS

| | | | | |
|---|---|---|---|---|
| 3,892,587 A * | 7/1975 | Abercrombie, Jr. | .......... | 106/486 |
| 4,082,905 A * | 4/1978 | Stephan et al. | ............ | 428/842.6 |
| 4,913,063 A * | 4/1990 | Jonas et al. | .................... | 106/413 |
| 4,935,063 A | 6/1990 | Costanzi et al. | | |
| 5,310,578 A * | 5/1994 | Thurn-Muller et al. | ...... | 427/220 |
| 5,376,698 A * | 12/1994 | Sipsas et al. | .................. | 523/200 |
| 5,741,356 A * | 4/1998 | Badejo et al. | ................. | 106/493 |
| 5,910,213 A | 6/1999 | Ashdown et al. | | |
| 6,126,736 A * | 10/2000 | Stoll et al. | ..................... | 106/506 |
| 6,645,286 B2 * | 11/2003 | Ostertag et al. | ............... | 106/460 |
| 6,828,364 B2 * | 12/2004 | Gugumus | ....................... | 524/95 |
| 6,946,517 B2 | 9/2005 | Gugumus | | |
| 7,144,840 B2 * | 12/2006 | Yeung et al. | .................. | 502/350 |
| 7,998,586 B2 | 8/2011 | Lu et al. | | |
| 8,097,340 B2 | 1/2012 | Harris et al. | | |
| 8,613,800 B2 * | 12/2013 | Wilhelm et al. | ............. | 106/415 |
| 2009/0061246 A1 | 3/2009 | Maltby et al. | | |
| 2009/0192252 A1 | 7/2009 | Stration et al. | | |
| 2010/0221513 A1 | 9/2010 | Anderson et al. | | |
| 2010/0247862 A1 | 9/2010 | May | | |
| 2011/0008630 A1 | 1/2011 | Okazaki et al. | | |
| 2011/0143924 A1 | 6/2011 | Hisata et al. | | |

FOREIGN PATENT DOCUMENTS

| | | |
|---|---|---|
| AT | 84056 T | 1/1993 |
| AT | 506124 T | 5/2011 |
| AU | 714824 B2 | 1/2000 |
| BR | 9704369 A | 5/1999 |
| CA | 1309307 C | 10/1992 |
| CA | 2212771 A1 | 2/1998 |

(Continued)

OTHER PUBLICATIONS

International Search Report and Written Opinion for PCT/US2012/048275 dated Oct. 1, 2012.

(Continued)

Primary Examiner — Anthony J Green
(74) Attorney, Agent, or Firm — Pepper Hamilton LLP

(57) ABSTRACT

Hydrophilic coating compositions and methods to make and use the compositions are disclosed. The compositions include a photocatalytic pigment material made up of an inorganic pigment and a monomeric anti-oxidants and free radical scavenger that is contacted to the surface of the inorganic pigment.

26 Claims, 3 Drawing Sheets

(56) References Cited

FOREIGN PATENT DOCUMENTS

| | | | |
|---|---|---|---|
| CN | 101970553 | A | 2/2011 |
| CZ | 9702582 | A3 | 2/1998 |
| DE | 3877099 | T2 | 5/1993 |
| EP | 0307054 | B1 | 12/1992 |
| EP | 0824137 | A2 | 2/1998 |
| EP | 2256153 | A1 | 12/2010 |
| EP | 2212032 | B1 | 4/2011 |
| ES | 2053709 | T3 | 8/1994 |
| GB | 2316400 | A | 2/1998 |
| HU | 9701378 | A2 | 6/1999 |
| IT | 1231221 | B | 11/1991 |
| JP | 1103635 | A | 4/1989 |
| JP | 03-013376 | A * | 1/1991 |
| JP | 10101961 | A | 4/1998 |
| JP | 2844341 | B2 | 1/1999 |
| KR | 20100113634 | A | 10/2010 |
| NO | 973735 | A | 2/1998 |
| PL | 321622 | A1 | 2/1998 |
| SG | 54532 | A1 | 11/1998 |
| SK | 110997 | A3 | 3/1999 |
| WO | WO2009/067414 | A1 | 5/2009 |
| WO | WO2009/116612 | A1 | 9/2009 |
| WO | WO2010/010600 | A1 | 1/2010 |
| ZA | 9706696 | A | 2/1998 |

OTHER PUBLICATIONS

Wa et al., Multicomponent polymer coating to block photocatalytic activity of TiO2 nanoparticles, *Chem Commun (Comb)*. (Sep. 12, 2007), 45:4815-4817 (Abstract).

* cited by examiner $$TiO_2 + Light \longrightarrow TiO_2^*(e/p)$$

$$TiO_2^*(e/p) + O_2 \longrightarrow TiO_2(p) + O_2\cdot^-$$

$$TiO_2(p) + H_2O \longrightarrow TiO_2 + H^+ + HO\cdot$$

$$H^+ + O_2\cdot^- \longrightarrow HOO\cdot$$

$$2\,HOO\cdot \longrightarrow H_2O_2 + O_2$$

$$TiO_2^*(e/p) + H_2O_2 \longrightarrow TiO_2 + 2\,HO\cdot$$

FIG. 1

HYDROPHILIC PAINTS USING PIGMENTS COATED WITH ANTI-OXIDANTS

CLAIM OF PRIORITY

This application is a U.S. national stage filing under 35 U.S.C. §371 of International Application No. PCT/US2012/048275 filed Jul. 26, 2012 entitled "Hydrophilic Paints Using Pigments Coated with Anti-oxidants," which is incorporated herein by reference in its entirety.

BACKGROUND

Decorative coatings and paints are used by consumer and industrial users to beautify and protect substrates. The most simple coatings and paints are made of a polymer (the binder) in a solvent (the vehicle), which is commonly called a lacquer. Numerous other components, such as pigments, stabilizers, thickeners and coalescing agents, can be added to the binder and vehicle system. Paints and coatings are used to modify the appearance of an object by adding color, gloss, or texture and by blending with or differentiating from a surrounding environment. For example, a surface that is highly light scattering (i.e. a flat surface) can be made glossy by the application of a paint that has a high gloss. Conversely, a glossy surface can be made to appear flat. Thus, the painted surface is hidden, altered, and ultimately changed in some manner by the presence of the coating. In addition, decorative paints protect the surface from the surrounding elements and prevent the corrosive process.

Although paints and coatings alter the appearance of the surface, the coating itself can get dirty. The dirt can dull the coating by increasing the light scattering or modifying the color. Many attempts to create organic coatings that resist dirt and contamination have been undertaken. In one case, hydrophobic coatings with a low surface energy that resist water and thus resistant to dirt have been created. For example, highly fluorinated polymers related to Teflon have been used for this purpose. These coatings often have a surface energy of 15 or less dynes, which results in water forming beads on the surface rather than wetting the surface. Generally, these coatings take more time to become contaminated and maintain the appearance of the object longer, but they still eventually need to be cleaned.

SUMMARY

The present disclosure is directed towards paints and coatings that provide a hydrophilic, self-cleaning surface when coated on an object. In one embodiment, a photocatalytic pigment material may be at least one inorganic pigment and at least one monomeric anti-oxidant that is contacted to the surface of the inorganic pigment. The photocatalytic pigment material may provide a renewable hydrophilic and self-cleaning surface when applied on a substrate.

In another embodiment, a method of preparing a photocatalytic pigment material may involve contacting at least one inorganic pigment with at least one anti-oxidant to form a mixture, and heating the mixture to form the photocatalytic pigment material.

In an additional embodiment, a composition for forming a renewable hydrophilic and self-cleaning coating may include a binder component and a photocatalytic pigment material. The photocatalytic pigment material may be at least one inorganic pigment and at least one anti-oxidant that is contacted to the surface of the inorganic pigment.

In a further embodiment, a method of providing a renewable hydrophilic and self-cleaning surface to a substrate may include applying a paint composition to the substrate, wherein the paint composition includes a photocatalytic pigment material made up of at least one inorganic pigment and at least one anti-oxidant that is contacted to the surface of the inorganic pigment.

In an additional embodiment, a UV-curable coating composition may include a binder component and a photocatalytic pigment material. The photocatalytic pigment material may be at least one inorganic pigment and at least one anti-oxidant that is contacted to the surface of the inorganic pigment.

BRIEF DESCRIPTION OF THE FIGURES

FIG. 1 shows the photocatalytic activity of titanium dioxide and production of free radicals according to an embodiment.

DETAILED DESCRIPTION

Figure 2:
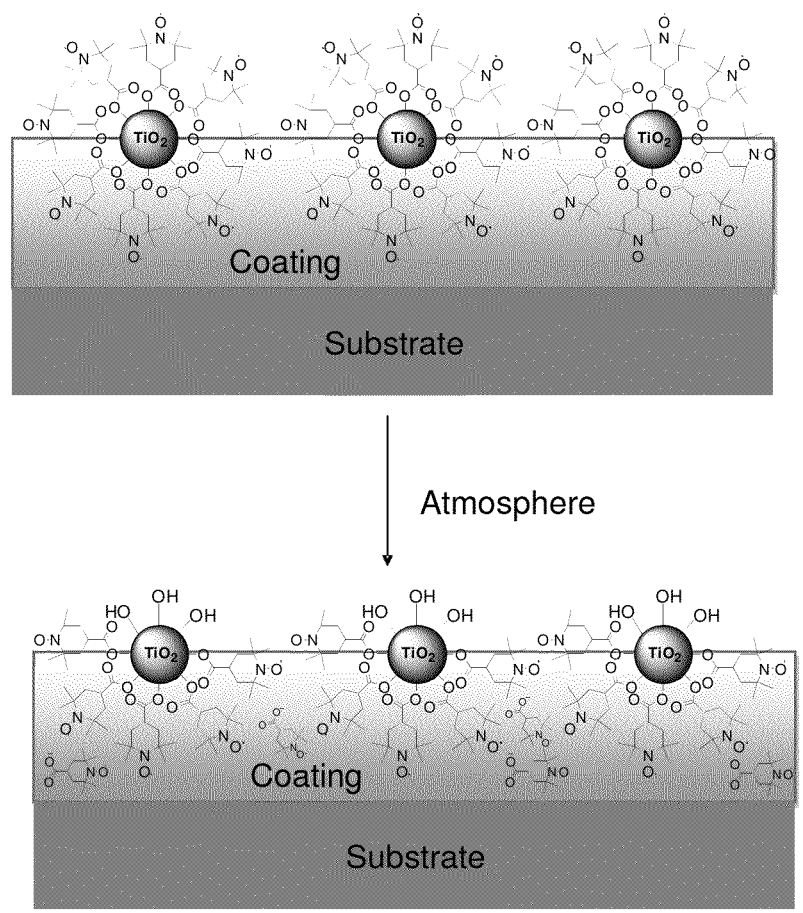
FIG. 2 depicts a coating with hindered amine light stabilizer modified titanium dioxide particles applied on a substrate according to an embodiment.

This disclosure is not limited to the particular systems, devices and methods described, as these may vary. The terminology used in the description is for the purpose of describing the particular versions or embodiments only, and is not intended to limit the scope.

"Alkyl" refers to monovalent saturated aliphatic hydrocarbyl groups having from 1 to 20 carbon atoms and preferably 1 to 10 carbon atoms. This term includes, by way of example, linear and branched hydrocarbyl groups such as methyl ($-CH_3$), ethyl ($-CH_2CH_3$), n-propyl ($-CH_2CH_2CH_3-$), isopropyl (($CH_3)_2CH-$), n-butyl ($CH_3CH_2CH_2CH_2-$), isobutyl (($CH_3)_2CHCH_2-$), sec-butyl (($CH_3)(CH_3CH_2)CH-$) and t-butyl (($CH_3)_3C-$).

"Aryl" refers to a aromatic carbocyclic group of from 5 to 14 carbon atoms having a single ring (e.g., benzo) or multiple condensed rings (e.g., naphthyl or anthryl) which condensed rings may or may not be aromatic.

"Heteroaryl" refers to an aromatic group that contains at least one heteroatom selected from the group consisting of oxygen, nitrogen and sulfur within the ring. Such heteroaryl groups can have a single ring (e.g., pyridinyl or furyl) or multiple condensed rings (e.g., indolizinyl or benzothienyl) wherein the condensed rings may or may not be aromatic and/or contain a heteroatom.

"Silane" refers to compounds containing silicon in which any or all of the hydrogen atoms have been replaced by other atoms or groups of atoms.

Decorative coatings and paints are high volume consumer products. As the name implies, the function of a decorative coating is to make an object look more visually appealing. However, in addition to accomplishing the beautification of an object, the coating must also afford some degree of substrate protection. As paints and coatings become covered and contaminated with unwanted substances, the appearance of the object often changes in undesirable ways. It is often expensive to clean the coated surface, and the detergents, surfactants, fragrances, alkali, lime, and/or other chemicals used to clean the surface make their way into the environment where they can potentially cause great damage. Thus, it is desirable to have a coating that keeps dirt from sticking to the surface, is self-cleaning, and contains environmental friendly chemicals.

Many paints and coatings include a photocatalytic pigment material, such as titanium dioxide, in their composition. The photocatalytic properties of titanium dioxide result from the promotion of electrons from the valence band to the conduction band under the influence of ultraviolet (UV) and near-UV radiation. The reactive electron-hole pairs that are created migrate to the surface of the titanium dioxide particles where the holes oxidize adsorbed water to produce reactive hydroxyl radicals and the electrons reduce adsorbed oxygen to produce superoxide radicals, both of which can degrade nitrogen compounds and volatile organic compounds in the air (FIG. 1). In view of these properties, photocatalytic titanium dioxide has been employed in coatings and the like to remove pollutants from the air. Such coatings may also have the advantage of being self-cleaning since soil (grease, mildew, mold, algae, etc.) is also oxidized on the surface.

The present work discloses methods and compositions for paints and coatings that provide hydrophilic, self-cleaning surface when coated on a substrate. In some embodiments, the photocatalytic pigment material may be at least one inorganic pigment and at least one monomeric anti-oxidant that is contacted to the surface of the inorganic pigment. The photocatalytic pigment material provides a renewable hydrophilic and self-cleaning surface when applied on a substrate. In some embodiments, the anti-oxidant may be a free radical scavenger.

In some embodiments, the inorganic pigments in the photocatalytic pigment material may be titanium dioxide, zinc oxide, copper oxide, hematite, magnetite, wüstite, chromium oxide, tin dioxide, carbonate pigments, or any combination thereof. In some embodiments, the inorganic pigment may be titanium dioxide particles. Titanium dioxide is produced in two crystal phases, rutile and anatase, that differ in lattice structures, refractive indices, and densities. The titanium dioxide may be a rutile titanium dioxide particle, an anatase titanium dioxide particle, or a mixture thereof. The titanium dioxide particles used in the coatings may have an average particle diameter of about 200 nanometers to about 2 microns, of about 200 nanometers to about 1 micron, of about 200 nanometers to about 750 nanometers, or of about 200 nanometers to about 500 nanometers. Specific examples include about 200 nanometers, about 400 nanometers, about 500 nanometers, about 600 nanometers, about 750 nanometers, about 800 nanometers, about 1 micron, about 2 microns, and ranges between (and including the endpoints) any two of these values. It is known that smaller particle sizes provide greater surface area and strong photo-catalytic effect. However, pigments smaller than the wavelength of light (400 nm) will not scatter light and will be transparent. Since the pigment particle size affects the photo-catalytic behavior, a blend of larger pigments (for scattering) and smaller pigments (for stronger photo-catalytic effect) can be used to create coatings tailored to the specific application.

In some embodiments, the titanium dioxide particles may be coated with at least one hydrated oxide of silicon, aluminum, calcium, zinc, or magnesium, or any mixture thereof. The silica coating helps to keep the hydroxyl and superoxide radicals formed by the photo-catalytic activity of titanium dioxide inside the pigment particle and prevent their release. This reduces or prevents the damage to the organic binders and extends the life of the paint. Titanium dioxide particles without a silicate coating may also be used in the composition.

In other embodiments, the inorganic pigments may contain anti-oxidants and free radical scavengers covalently attached to the surface. Upon exposure to air, the anti-oxidants or free radical scavenger moieties are cleaved and expose the hydrophilic pigment surface. The anti-oxidants and/or free radical scavengers may be at least one hindered amine light stabilizer (HALS), phenolic compounds, phenone, amine, thio compound, ascorbic acid, carotene, lycopene, tocopherol, tocotrienol, tannin, phytic acid, oxalic acid, uric acid or a combination thereof. Specific examples include, but are not limited to, glutathione; propyl gallate; 3,5-di-tert-butyl-4-hydroxybenzoic acid; 2,4-dimethyl-6-tert-butylphenol ; 2,4-dimethyl-6-tert-butylphenol; 2,4-dimethyl-6-tert-butylphenol; 2,6-di-tert-butyl-4-methylphenol and hydroxyanisole.

HALS may be derivatives of 2,2,6,6-tetramethyl piperidine and are extremely efficient stabilizers against light-induced degradation of most polymers. HALS do not absorb UV radiation, but act to inhibit degradation of the polymer through the formation of nitroxyl moieties. They slow down the degradation reactions initiated by the photocatalytic function of titanium dioxide particles, and thus behave as anti-oxidants. In some embodiments, the anti-oxidant may be a HALS represented by the formula:

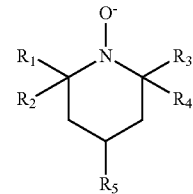

where each of $R_1$, $R_2$, $R_3$ and $R_4$ is, independently, an alkyl, an alkene, an alkyne, an aryl, an ether, an ester, a heteroalkyl, or a heteroaryl group. $R_5$ is a carboxyl group, an acyl chloride group, a hydroxyl group or a silane. In some embodiments, each of $R_1$, $R_2$, $R_3$ and $R_4$ is, independently, an alkyl, an alkyne, an aryl, an ether, an ester, a heteroalkyl, or a heteroaryl group. In other embodiments, each of $R_1$, $R_2$, $R_3$ and $R_4$ is, independently, an alkyl, an alkene, an aryl, an ether, an ester, a heteroalkyl, or a heteroaryl group. In some embodiments, each of $R_1$, $R_2$, $R_3$ and $R_4$ is, independently, an alkyl, an alkene, an alkyne, or an ester group. In some embodiments, each of $R_1$, $R_2$, $R_3$ and $R_4$ is, independently, an aryl, an ether, an ester, a heteroalkyl, or a heteroaryl group. Examples of HALS moieties include, but are not limited to, 2,2,6,6-tetramethyl-piperidin-4-ol; (2,2,6,6-tetramethyl-piperidin-4-yloxy)-acetic acid; 3-(2,2,6,6-tetramethyl-piperidin-4-yloxy)-propionic acid; 3-(2,2,6,6-tetramethyl-piperidin-4-yloxy)-butanoic acid; 3-(2,2,6,6-tetramethyl-piperidin-4-yloxy)-pentanoic acid; 3-(2,2,6,6-tetramethyl-piperidin-4-yloxy)-hexanoic acid; 4-hydroxy-2,2,6,6-tetramethyl-piperidine-4-carboxylic acid; 4-methoxy-2,2,6,6-tetramethyl-piperidine-4-carboxylic acid; 4-ethoxy-2,2,6,6-tetramethyl-piperidine-4-carboxylic acid; 4-propoxy-2,2,6,6-tetramethyl-piperidine-4-carboxylic acid; 4-butoxy-2,2,6,6-tetramethyl-piperidine-4-carboxylic acid and 4-pentoxy-2,2,6,6-tetramethyl-piperidine-4-carboxylic acid. Examples of silane derivatives, but not limited to, may be 2,2,6,6-tetramethyl-piperidin-4-yloxy)-trimethoxymethylsilane,; (2,2,6,6-tetramethyl-piperidin-4-yloxy)-trimethoxyethylsilane; (2,2,6,6-tetramethyl-piperidin-4-yloxy)-trimethoxypropylsilane; (2,2,6,6-tetramethyl-piperidin-4-yloxy)-triethoxymethylsilane; (2,2,6,6-tetramethyl-piperidin-4-yloxy)-triethoxyethylsilane; (2,2,6,6-tetramethyl-piperidin-4-yloxy)-triethoxypropylsilane; (2,2,6,6-tetramethyl-piperidin-4-yloxy)-tri(propene-2-oxy)methylsilane; (2,2,6,6-tetramethyl-piperidin-4-yloxy)-tri(propene-2-oxy)ethylsilane; (2,2,6,6-tetramethyl-piperidin-4-yloxy)-tri(propene-2-oxy)propylsilane, (2,2,6,6-tetramethyl-piperidin-4-yloxy)-tri(methylethylketoximino)methylsilane; (2,2,6,6-tetramethyl-piperidin-4-yloxy)-tri(methyl ethylketoximino)ethylsilane and (2,2,6,6-tetramethyl-piperidin-4-yloxy)-tri(methylethyl ketoximino)propylsilane.

In some embodiments, the photocatalytic pigment material may be a monomeric HALS attached to the surface of the titanium dioxide particle. In some embodiments, the photocatalytic pigment material may be a monomeric HALS attached to the surface of the carbonate pigments, such as calcium carbonate. In some embodiments, a mixture of inorganic pigments described herein with a surface treated with a monomeric HALS may be used.

The photocatalytic pigment material may be dispersed in one or more organic binders, preferably a polymeric organic binder. In the broadest aspect, it is contemplated that any polymeric binder may be employed. In some embodiments, the polymeric binder is a water-dispersible polymer. The water-dispersible polymer may include a latex binder, such as natural latex, neoprene latex, nitrile latex, acrylic latex, vinyl acrylic latex, styrene acrylic latex, styrene butadiene latex, or the like. Compositions may include a single binder or a mixture of two or more polymeric binders that may be of the same class or different. For example, organic binders may be combined with a silicon-based binder.

In some embodiments, the photocatalytic material may be dispersed in inorganic binders. Inorganic binders may include, without limitation, alkali metal silicates, such as potassium silicate, sodium silicate, lithium silicate or the like.

In some embodiments, the photocatalytic pigment material when incorporated into a paint or a coating substance provides a renewable hydrophilic and self-cleaning surface when applied on the substrate. FIG. 2 illustrates a coating embodiment. When the coating is exposed to the atmosphere, the HALS on the surface of the titanium dioxide pigment particles is cleaved. This results in the free HALS molecules migrating into the coating and exposing the surface of pigment particles. The surface of pigment particles are hydrophilic, and thus provide a hydrophilic self-cleaning coating. Further, the carboxy moieties of the HALS also contribute to the formation of hydrophilic surface. In addition, any organic compounds that contaminate the surface are decomposed by the photo-catalytic action of the pigment particles. In some embodiments, a new layer of HALS-titanium dioxide pigments may be generated as the surface wears, thus providing a constant hydrophilic surface. In addition, the coating may also provide excellent protection to the substrate. Due to the presence of organic binders, the coating may provide excellent adhesion to the substrate and reduce or prevent water, electrolytes, organics, and other contaminates from harming the substrates. A wide choice of organic binders may be used to impart excellent abrasion and chemical resistance properties to the coating.

The coating of the present disclosure may be applied to any substrate. The substrate may be an article, an object, a vehicle or a structure. Although no particular limitation is imposed on the substrate to be used in the present disclosure, glasses, plastics, metals, ceramics, wood, stones, cement, fabric, paper, leather, and combinations or laminations thereof may be used. The coating may be applied to a substrate by spraying, dipping, rolling, brushing, or any combination thereof.

In some embodiments, the coating compositions may be UV-curable systems or aqueous systems. For UV-curable systems, any of the compounds known in the art for promoting free radical polymerization using conventional ultraviolet light sources may be used in the coating. UV initiators for free-radical polymerization include aromatic ketones, such as benzophenone, and benzoin ethers, such as benzoin isobutyl ether.

Paints and coatings of the present disclosure may contain one or more additives that alter the properties of the paint, from shelf life to application and longevity, to health and safety. Such additives may be added, for example, during the manufacture of the emulsion polymer or during the formulation of the paint itself. Additives include initiators, rheology modifiers, preservatives, coalescing agents, stabilizers and the like. Initiators, such as persulfates, may be added to the coatings of the present disclosure. Initiators are a source of free radicals to initiate the polymerization process in which monomers condense to form the polymers. Coatings may also contain a redox system initiator, such as ferrous and thiosulfate along with the persulfate salts, that promote polymerization at room temperature.

In some embodiments, thickeners and rheology modifiers may be added to achieve the desired viscosity and flow properties. Thickeners function by forming multiple hydrogen bonds with the acrylic polymers, thereby causing chain entanglement, looping and/or swelling which results in volume restriction. Thickeners, such as cellulose derivatives including hydroxyethyl cellulose, methyl cellulose and carboxymethyl cellulose, may be used in the compositions.

In some embodiments, preservatives may be added in the coating compositions in low doses to protect against the growth of microorganisms. Preservatives, such as methyl benzisothiazolinones, chloromethylisothiazolinones, barium metaborate and 1-(3-chloroallyl)-3,5,7-triaza-1-azoniaadamantane chloride, may be used.

The coating compositions of the disclosure may also comprise extenders or fillers which serve to thicken coating films and support the structure of the coating composition. Some extenders may also provide hiding power and function as pigments, particularly above the critical pigment volume concentration, and most extenders are color neutral. Common extenders include clays such as kaolin clays, china clays, talcs, quartz, barytes (barium sulphate) and carbonate salts such as calcium carbonate, zinc carbonate, magnesium carbonate or mixtures thereof.

In some embodiments, stabilizers, such as ethylene and propylene glycol, may be used. Stabilizers help to reduce or prevent formation of ice crystals at low temperatures in waterborne paints, thereby retaining the dispersion stability and reducing damage to the polymers.

Figure 3:
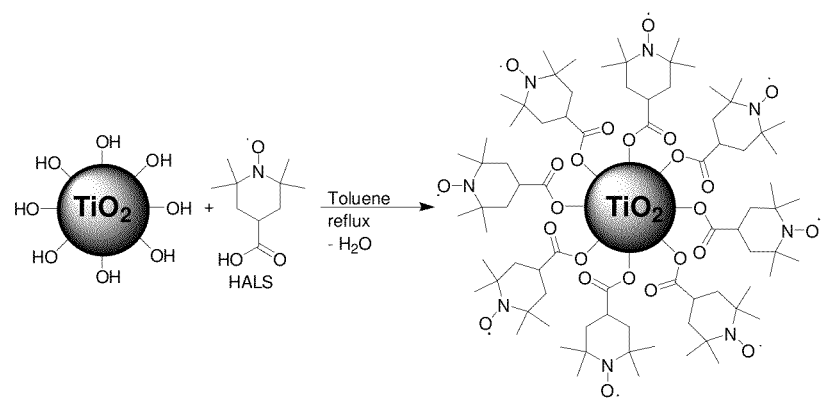
FIG. 3 illustrates the surface treatment of titanium dioxide particles with hindered amine light stabilizer according to an embodiment.

In some embodiments, a method for preparing photocatalytic material involves mixing at least one inorganic pigment with at least one anti-oxidant and heating under a reflux. The inorganic pigment may include any of the inorganic pigments described herein. The anti-oxidant may include any of the anti-oxidants or free radical scavengers described herein. The carboxyl moiety of the anti-oxidant and the hydroxyl group of the inorganic pigment combine to form an ester during this process. A Dean-Stark apparatus or any other equivalent reflux apparatus may be used for this process. In some embodiments, the HALS or any other anti-oxidant described herein is dissolved in a solvent that forms azeotrope with water. Examples of such solvents include toluene, xylene, chloroform and methylene chloride. In some embodiments, a small amount of catalyst such as p-toluene sulfonic acid may be included in the reaction. The reflux reaction may be performed from about 1 hour to about 10 hours, from about 1 hour to about 8 hours, from about 1 hour to about 6 hours, or from about 1 hour to about 5 hours. Specific examples include about 1 hour, about 1.5 hours, about 5 hours, about 6 hours, about 7.5 hours, about 8 hours, about 10 hours, and ranges between (and including the endpoints) any two of these values. In some embodiments, the anti-oxidant and the inorganic pigment may be mixed in a weight to weight ratio of about 1:1000 to about 3:10, of about 1:1000 to about 1:10, or of about 1:1000 to about 1:100. Specific examples include about 1:1000, about 1:100, about 1:20, about 1:10, about 3:10, and ranges between any two of these values. After the reflux reaction, the mixture may be cooled to room temperature and the product may be filtered and dried. FIG. 3 illustrates the surface treatment of titanium dioxide particles with HALS.

EXAMPLES

Example 1

Preparation of Surface Treated Titanium Dioxide Pigments

About 100 grams of commercially available titanium dioxide (average particle diameter of about 500 nanometers) is mixed with 10 grams of HALS ((2,2,6,6-tetramethyl-piperidin-4-yloxy)-acetic acid or the N-oxide of the same compound) in 150 ml of toluene. The mixture is refluxed using a Dean-Stark apparatus in the presence of trace amount of p-toluene sulfonic acid for about 5 hours. At the end of this period, the mixture is cooled to room temperature and the product is filtered, washed with toluene and dried in a vacuum oven for 2 hours.

Example 2

Preparation of Surface Treated Titanium Dioxide Pigments

About 100 grams of commercially available titanium dioxide (average particle diameter of about 500 nanometers) is mixed with 10 grams of HALS (4-ethoxy-2,2,6,6-tetramethyl-piperidine-4-carboxylic acid or the N-oxide of the same compound) in 150 ml of toluene. The mixture is refluxed using a Dean-Stark apparatus in the presence of trace amount of p-toluene sulfonic acid for about 5 hours. At the end of this period, the mixture is cooled to room temperature and the product is filtered, washed with toluene and dried in a vacuum oven for 2 hours.

Example 3

Preparation of Surface Treated Titanium Dioxide Pigments

About 100 grams of commercially available titanium dioxide (average particle diameter of about 500 nanometers) is mixed with 10 grams of 3,5-di-tert-butyl-4-hydroxybenzoic acid in 150 ml of toluene. The mixture is refluxed using a Dean-Stark apparatus in the presence of trace amount of p-toluene sulfonic acid for about 5 hours. At the end of this period, the mixture is cooled to room temperature and the product is filtered, washed with toluene and dried in a vacuum oven for 2 hours.

Example 4

Preparation of a Hydrophilic Coating

A hydrophilic coating is prepared having the following components: 40 grams of surface treated titanium dioxide pigment (Example 1), 2 grams of thickener (hydroxyethyl cellulose), 150 grams of solvent (water), 70 grams of binder (methyl methacrylate), 0.3 grams of coalescing agent (2,2,4-trimethyl-1,3-pentanediolmono(2-methylpropanoate)), and 0.05 grams of bactericide. The components are mixed under high shear for 30 minutes.

Example 5

Evaluation of Hydrophilic Property

The hydrophilic coating containing modified titanium dioxide particles of Example 1 is coated on a glass surface and dried in an oven at 100° C. for 10 minutes. The surface free energy and the water droplet contact angle of the hydrophilic coating is measured as follows. A Zisman plotting method is employed for measuring surface free energy. The surface tension of various concentration of the aqueous solution of magnesium chloride is plotted along the X-axis and the contact angle in terms of cos θ is plotted along the Y-axis. A graph with a linear relationship between the two is obtained. The graph is extrapolated such that the surface tension at contact angle 0° is measured and is defined as the surface free energy of the solid. The surface free energy of the glass surface measured will be 84 milliNewton/meter.

Example 6

Evaluation of Hydrophilic Coating

The hydrophilic coating containing modified titanium dioxide particles of Example 2 is coated on a glass substrate and evaluated for the following properties.

Hydrophilicity: The water droplet contact angle in air is measured by using DropMaster 500 (Kyowa Interface Science Co., Ltd) and will be 10°.

Water resistance: The hydrophilic coating is subjected to a rubbing treatment with sponge in 10 reciprocations in water while applying a load of 1 kg, and the amount of residual film is calculated from a change of weight before and after the rubbing treatment. The weight of the residual film will be 99% of the initial weight before rubbing.

Weather resistance: The hydrophilic coating is exposed in a chamber to a xenon arc lamp that is calibrated to mimic the sun spectral characteristics. The exposure is performed for 500 hours and is evaluated for hydrophilicity, water resistance and durability. The hydrophilic coating will exhibit same properties before and after the exposure.

Example 7

Measuring Self-cleaning Properties

The self-cleaning properties of each paint sample is investigated based on their ability to degrade the organic dye methylene blue. As the dye is degraded to water, carbon dioxide, and nitrogen containing species, a loss of color is observed. The photoactivity is monitored by measuring the brightness. The protocol is as follows: a film of paint is coated on a substrate such as a glass plate. The film thickness is similar to that used in the final application and generally not less than 25 microns thick when dry and the paint film is allowed to dry at least overnight. A solution of methylene blue in water (0.373 grams/L) is prepared and applied on the coated substrate and allowed to sit for about 60 minutes. The excess of methylene blue solution is removed and the substrate surface is dried and brightness value of the surface is measured. The substrate surface is exposed to UV light for about 48 hours at an intensity of 30 to 60 W/m$^2$ (300-400 nm wavelengths) and the brightness value is re-measured. The brightness value will be 20% lesser than the initial value, thus demonstrating the self-cleaning power of the coating.

Example 8

An Object Coated with Hydrophilic Paint

A wooden chair is painted with a hydrophilic coating containing surface treated titanium dioxide pigment (Example 3) and is allowed to dry at room temperature. The surface free energy of the chair is measured as explained in Example 5 and will be 84 milliNewton/meter. The anti-fouling property of the coating is measured as follows: A line is drawn on the coated chair using oily ink. A similar line is also drawn on a chair which is not coated. A water jet is continuously applied on both the surfaces and periodically checked whether the oily line is erased. The oily ink applied on the coated chair will be erased after 1 minute whereas the oily line on the un-coated chair will be present.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions or biological systems, which can, of course, vary. It is also to be understood that the terminology used herein is for the purpose of describing particular embodiments only, and is not intended to be limiting.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

What is claimed is:

1. A photocatalytic pigment material comprising:
   at least one inorganic pigment; and
   at least one monomeric anti-oxidant represented by a hindered amine light stabilizer of formula:

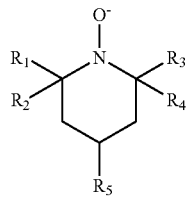

wherein each of $R_1$, $R_2$, $R_3$ and $R_4$ is, independently, an alkyl, an alkenyl, an alkynyl, an aryl, an ether, an ester, a heteroalkyl, or a heteroaryl group,
   wherein $R_5$ is a carboxyl group, an acyl chloride group, a hydroxyl group or a silane,
   wherein the anti-oxidant is contacted to the surface of the inorganic pigment, and
   wherein the photocatalytic pigment material provides a renewable hydrophilic and self-cleaning surface when applied on a substrate.

2. The material of claim 1, wherein the inorganic pigment is titanium dioxide, zinc oxide, copper oxide, hematite, magnetite, wüstite, chromium oxide, tin dioxide, carbonate pigments, or any combination thereof.

3. The material of claim 1, wherein the inorganic pigment is a rutile titanium dioxide particle, an anatase titanium dioxide particle, or a mixture thereof.

4. The material of claim 1, wherein the inorganic pigment includes a titanium dioxide particle coated with at least one hydrated oxide of silicon, aluminum, calcium, zinc, or magnesium, or any mixture thereof.

5. The material of claim 1, wherein the material is a monomeric hindered amine light stabilizer contacted to the surface of a titanium dioxide particle, wherein the hindered amine light stabilizer is represented by the formula:

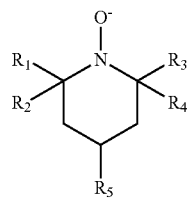

wherein each of $R_1$, $R_2$, $R_3$ and $R_4$ is, independently, an alkyl, an alkenyl, an alkynyl, an aryl, an ether, an ester, a heteroalkyl, or a heteroaryl group, and
   wherein $R_5$ is a carboxyl group, an acyl chloride group, a hydroxyl group or a silane.

6. The material of claim 1, wherein the photocatalytic pigment material is incorporated into a paint or a coating substance.

7. A method of preparing a photocatalytic pigment material, the method comprising:
   contacting at least one inorganic pigment with at least one anti-oxidant to form a mixture, wherein the at least one anti-oxidant is a hindered amine light stabilizer represented by the formula:

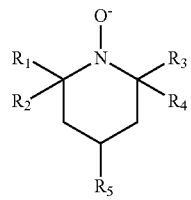

wherein each of $R_1$, $R_2$, $R_3$ and $R_4$ is, independently, an alkyl, an alkenyl, an alkynyl, an aryl, an ether, an ester, a heteroalkyl, or a heteroaryl group, and
   wherein $R_5$ is a carboxyl group, an acyl chloride group, a hydroxyl group or a silane; and
   heating the mixture to form the photocatalytic pigment material.

8. The method of claim 7, wherein contacting at least one inorganic pigment with at least one anti-oxidant comprises contacting the anti-oxidant with the inorganic pigment selected from the group consisting of titanium dioxide, zinc oxide, copper oxide, hematite, magnetite, wüstite, chromium oxide, tin dioxide, carbonate pigment, and any combination thereof.

9. The method of claim 7, wherein contacting the inorganic pigment with the anti-oxidant comprises combining the inorganic pigment with the anti-oxidant in the presence of a solvent and a catalyst.

10. The method of claim 7, wherein contacting the inorganic pigment with the anti-oxidant comprises combining the anti-oxidant with the inorganic pigment in a weight to weight ratio of about 1:1000 to about 3:10.

11. The method of claim 7, wherein heating the mixture comprises heating the mixture under a reflux for about 1 hour to about 10 hours.

12. A composition for forming a renewable hydrophilic and self-cleaning coating, the composition comprising:
   a photocatalytic pigment material comprising at least one inorganic pigment and at least one monomeric anti-oxidant represented by a hindered amine light stabilizer of formula:

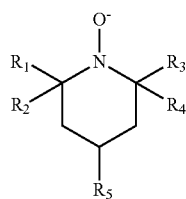

wherein each of $R_1$, $R_2$, $R_3$ and $R_4$ is, independently, an alkyl, an alkenyl, an alkynyl, an aryl, an ether, an ester, a heteroalkyl, or a heteroaryl group, wherein $R_5$ is a carboxyl group, an acyl chloride group, a hydroxyl group or a silane, and wherein the anti-oxidant is contacted to the surface of the inorganic pigment; and a binder component.

13. The composition of claim 12, wherein the inorganic pigment comprises titanium dioxide particles having a particle diameter of about 200 nanometers to about 2 microns.

14. The composition of claim 12, wherein the monomeric hindered amine light stabilizer contacts the surface of titanium dioxide particles.

15. The composition of claim 12, wherein the binder comprises one or more silicone polymers, one or more organic polymers, or a combination thereof.

16. The composition of claim 12, wherein the coating is a decorative paint.

17. A method of providing a renewable hydrophilic and self-cleaning surface to a substrate, the method comprising:

applying a paint composition to the substrate, wherein the paint composition comprises a photocatalytic pigment material that comprises at least one inorganic pigment and at least one monomeric anti-oxidant represented by a hindered amine light stabilizer of formula:

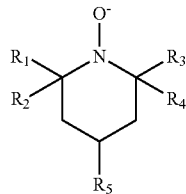

wherein each of $R_1$, $R_2$, $R_3$ and $R_4$ is, independently, an alkyl, an alkenyl, an alkynyl, an aryl, an ether, an ester, a heteroalkyl, or a heteroaryl group, wherein $R_5$ is a carboxyl group, an acyl chloride group, a hydroxyl group or a silane, and wherein the anti-oxidant is contacted to the surface of the inorganic pigment.

18. The method of claim 17, wherein the inorganic pigment is titanium dioxide, zinc oxide, copper oxide, hematite, magnetite, wüstite, chromium oxide, tin dioxide, carbonate pigments, or any combination thereof.

19. The method of claim 17, wherein the inorganic pigment comprises titanium dioxide particles having a particle diameter of about 200 nanometers to about 2 microns.

20. The method of claim 17, wherein the monomeric hindered amine light stabilizer contacts the surface of titanium dioxide particles.

21. The method of claim 17, wherein the paint composition is applied to the substrate by coating, dipping, rolling, spraying, brushing, or any combination thereof.

22. The method of claim 17, wherein the substrate is an article, an object, a vehicle, or a structure.

23. A UV-curable coating composition comprising:

a photocatalytic pigment material comprising at least one inorganic pigment and at least one monomeric anti-oxidant represented by a hindered amine light stabilizer of formula:

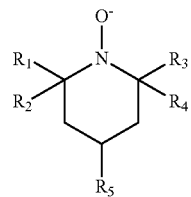

wherein each of $R_1$, $R_2$, $R_3$ and $R_4$ is, independently, an alkyl, an alkenyl, an alkynyl, an aryl, an ether, an ester, a heteroalkyl, or a heteroaryl group, wherein $R_5$ is a carboxyl group, an acyl chloride group, a hydroxyl group or a silane, and wherein the anti-oxidant is contacted to the surface of the inorganic pigment; and a binder component.

24. The composition of claim 23, wherein the inorganic pigment comprises titanium dioxide particles having a particle diameter of about 200 nanometers to about 2 microns.

25. The composition of claim 23, wherein the monomeric hindered amine light stabilizer contacts the surface of titanium dioxide particles.

26. The composition of claim 23, wherein the binder comprises one or more silicone polymers, one or more organic polymers, or a combination thereof.

* * * * *